United States Patent
Robley et al.

(10) Patent No.: US 8,001,933 B2
(45) Date of Patent: Aug. 23, 2011

(54) RETRACTABLE PET LEASH AND COLLAR APPARATUS

(76) Inventors: Robert Cosmo Robley, Cedarville, MI (US); Dawn Marie Robley, Cedarville, MI (US)

( * ) Notice: Subject to any disclaimer, the term of this patent is extended or adjusted under 35 U.S.C. 154(b) by 871 days.

(21) Appl. No.: 11/825,476

(22) Filed: Jul. 6, 2007

(65) Prior Publication Data

US 2008/0017134 A1  Jan. 24, 2008

Related U.S. Application Data

(60) Provisional application No. 60/819,109, filed on Jul. 7, 2006.

(51) Int. Cl.
*A01K 27/00* (2006.01)
(52) U.S. Cl. .......................................... 119/792; 119/796
(58) Field of Classification Search .......... 119/792–794, 119/796
See application file for complete search history.

(56) References Cited

U.S. PATENT DOCUMENTS

| | | | | |
|---|---|---|---|---|
| 870,784 | A * | 11/1907 | Huff | 119/794 |
| 1,657,250 | A * | 1/1928 | Fetters | 119/858 |
| 2,889,807 | A * | 6/1959 | Beebe | 119/794 |
| 3,198,175 | A * | 8/1965 | Dean | 119/796 |
| 3,318,288 | A * | 5/1967 | Mullritter | 119/796 |
| 3,355,075 | A * | 11/1967 | Dean | 224/262 |
| 3,776,198 | A * | 12/1973 | Gehrke | 119/794 |
| 4,328,767 | A * | 5/1982 | Peterson | 119/794 |
| 4,964,370 | A * | 10/1990 | Peterson | 119/794 |
| 5,816,198 | A * | 10/1998 | Peterson | 119/794 |
| 6,481,382 | B2 | 11/2002 | Cohn | |
| 6,581,547 | B1 | 6/2003 | Austin | |
| 6,904,872 | B2 * | 6/2005 | Muller | 119/796 |
| 7,017,527 | B2 | 3/2006 | Price | |
| 7,461,615 | B2 * | 12/2008 | Albright | 119/794 |
| 2004/0154556 | A1 * | 8/2004 | Masterson et al. | 119/794 |
| 2006/0042562 | A1 | 3/2006 | Wagner | |
| 2006/0054108 | A1 | 3/2006 | Eulete et al. | |

* cited by examiner

*Primary Examiner* — Kimberly S Smith
(74) *Attorney, Agent, or Firm* — James Ray & Assoc

(57) ABSTRACT

The present invention provides a retractable pet leash apparatus having a hollow casing, a spool which is mounted for rotation within the casing and which has a pair of sides, a leash which is coiled on the spool in a retracted position and which is extendable through an aperture formed in a wall of the hollow casing upon application of a force, a spring means which is disposed within the hollow housing and which is engageable with the spool for biasing the spool for rotation to retract the leash into the hollow casing. A brake device is engageable with the spool for selectively fixing a free end of the leash at a predetermined distance from the casing and enabling retraction and extension of the leash relative to the hollow casing. The invention also provides a pocket on the exterior surface of the casing for receiving pet identification or immunization tag and a carrying ring.

13 Claims, 3 Drawing Sheets

RETRACTABLE PET LEASH AND COLLAR APPARATUS

CROSS-REFERENCE TO RELATED APPLICATIONS

This application is related to and claims priority from Provisional Patent Application Ser. No. 60/819,109 filed Jul. 7, 2006.

FIELD OF THE INVENTION

The present invention relates, in general, to retractable pet leash devices and, more particularly, this invention relates to a selectively extendable and retractable leash apparatus which has a leash containing casing thereof being positioned adjacent the collar in non-operative position and which is moveable away from the collar during use.

BACKGROUND OF THE INVENTION

One difficulty that is continuously experienced by a pet owner is in that locating and attaching a conventional leash to the pet's collar requires greater than desirable effort. When stored, leashes become tangled or lost. Impatient pets do not understand why they have to wait to go outside, leading to overanxious behaviors such as jumping, whining and accidents and further increasing the effort of attaching the leash to the pet's collar. If the leash cannot be quickly located, the pet owner often resorts to using substitute items such as ropes or cords which are typically not designed for use with the pet.

Prior to the present invention, efforts have been made to alleviate the difficulty of locating, storing and attaching leash by providing combined pet collar and retractable leash devices.

U.S. Pat. No. 6,581,547 issued to Austin and U.S. Pat. No. 6,481,382 issued to Cohn disclose one type of such combined pet collar and retractable leash device wherein the leash and the recoil mechanism are disposed within the collar cavity. U.S. Pub. No. 2006/0042562 discloses another type of such device wherein the leash is simply wrapped around and fastened to the collar when not in use. However, these prior art devices are cumbersome to use and do not incorporate brake mechanism to releaseably fix the leash at a preselected length during use.

U.S. Pat. No. 7,017,527 issued to Price and U.S. Pat. No. 4,977,860 issued to Harwell provide retractable leash mechanism including a casing which is secured to the collar, a spool mounted for rotation within the casing and giving the leash coiled thereon in a retracted condition and a spring for biasing the spool to rotate for retracting the leash into the casing. While being simpler to use, U.S. Pat. No. 7,017,527 and U.S. Pat. No. 4,977,860 do not incorporate brake mechanism and are rigidly fixed to the pet's collar.

U.S. Pub. No. 2006/0054108 provides a retractable dog leash device which is designed to attach to the collar of a pet and be permanently worn in this manner and which is small and lightweight. The system includes an ergonomic handle that fits neatly against the case when the leash is in a retracted condition. Advantageously, the leash system includes a leash retraction biasing mechanism that is free on one end permitting an unwinding of the biasing mechanism and not merely a tightening of it. The biasing mechanism is manually released to enable retraction of the leash into the casing. However, one disadvantage of this prior art retractable leash system is in that the pet is free to extend the leash to its maximum length during use thus providing the owner with a decreased control in situations when the owner must hold the pet by the collar. Another disadvantage of this prior art retractable leash system is in that the leash may be allowed to extend from the casing due to the weight of the handle when the pet is jumping and running and may get caught in such extended position thus exposing the pet to a potential hazard. Yet another disadvantage is in that the casing is removably attached to the collar with a clip which is positioned between the interior surface of the collar and the pet's skin thus potentially exposing pet's skin to irritation during use and which suggests that the device is detached from the collar when it is not use thus increasing the chances of its being lost or misplaced.

SUMMARY OF THE INVENTION

According to one embodiment, the invention provides a combination pet collar and a leash apparatus. The apparatus includes a hollow casing which has each of a predetermined shape and a predetermined size. A leash spool has a drum with a through bore for rotation on an axle which extends from interior surface defined by the hollow casing and a pair of sides each disposed on and secure to a respective end of the drum. A leash is coiled on the drum in a retracted position and is extendable through an aperture formed in a wall of the hollow casing upon application of a force. A spring is disposed within the hollow casing and is engageable with the spool and the axle for biasing the spool for rotation to retract the leash into the hollow casing. There is means which is disposed on and secured to a free end of the leash and to the collar for securing the apparatus thereto. Thus, the hollow casing is positioned adjacent the collar in a non-operable position and is manually moved in a direction away from the collar to extend the leash during use.

According to another embodiment of the invention, therein is provided a brake device for a retractable leash apparatus. The brake device includes a plurality of spaced apart notches formed in the each side of the leash spool of such retractable leash apparatus. A lever is provided which has a longitudinal axis. There is a stop member which is secured to and disposed on one end of the lever perpendicular to the longitudinal axis. The stop member is sized to operatively engage a pair of opposed notches. A shaft portion is formed intermediate ends of the lever and parallel to the stop member. The shaft portion has each end thereof received within a socket formed on the interior surface of the hollow casing of such retractable leash apparatus. A button shaped member is disposed on and secured to an opposed end of the lever. The button shaped member extends outwardly from an upper surface of the lever and protrudes through an aperture formed within a wall of the hollow casing. The button shaped member is manually depressed to disengage the stop member from the pair of notches. There is spring which has a coiled portion thereof being positioned on the shaft portion, a first end thereof which is formed in abutting relationship with the interior surface of the hollow casing, and a second end thereof which is formed to rest on an upper surface of one of the lever and the stop member. The spring returns the stop member into engagement with the pair of notches when the button shaped member is released.

The present invention also provides means to position a document on the outer surface of the casing which identifies the pet wearing the collar.

OBJECTS OF THE INVENTION

It is, therefore, one of the primary objects of the present invention to provide a combined pet's collar and retractable leash apparatus.

Another object of the present invention is to provide a combined pet's collar and retractable leash apparatus having a leash containing casing which is permanently secured to the collar.

Yet another object of the present invention is to provide a combined pet's collar and retractable leash apparatus having a leash containing casing which is moved away from the collar during use.

A further object of the present invention is to provide a combined pet's collar and retractable leash apparatus which includes a manually operable brake mechanism enabling controlled extension and retraction of the leash.

Yet a further object of the present invention is to provide combined pet's collar and retractable leash apparatus which is conveniently worn by the pet.

An additional object of the present invention is to provide a combined pet's collar and retractable leash apparatus which enables the owner simply affix pet's identification or immunization record.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
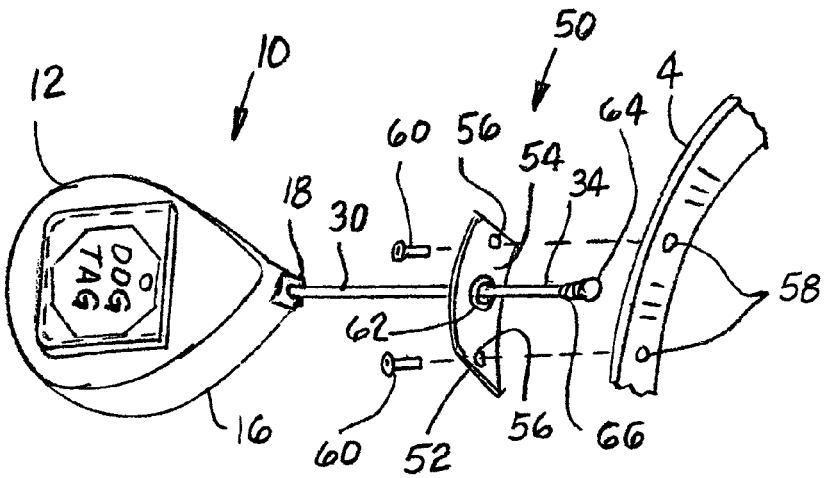
FIG. 1 is a perspective view of a retractable pet leash and collar apparatus of the present invention.

Prior to proceeding to the more detailed description of the present invention, it should be noted that, for the sake of clarity and understanding, identical components which have identical functions have been identified with identical reference numerals throughout the several views illustrated in the drawing figures.

Reference is now made, to FIGS. 1-7, wherein there is shown a novel leash apparatus, generally designated as 10, for use in combination with a pet collar 4. The apparatus 10 includes a hollow casing 12 having each of a predetermined shape and a predetermined size. In a conventional manner, the hollow casing is made from a pair of casing halves 12a and 12b, formed preferably from a plastic material, which are joined together at assembly. A leash spool 20 is mounted for rotation on a stationary axle 14 which extends from interior surface of one of the pair of casing halves, shown as 12a in FIG. 3. The leash spool 20 includes a drum 22 having a through bore 23 which is sized to operably receive the axle 14. A first side 24 is disposed on and secured to one end of the drum 22. The first side 24 is adapted with an outwardly oriented cavity 26 which is simply formed by an annular flange 27. A second side 28 is disposed on and secured to an opposed end of the drum 22. It is presently preferred for the leash spool 20 to be manufactured as a unitary member from a plastic material by a molding process.

A leash 30 is coiled on the drum 22 in a retracted position and is extendable through a leash aperture 18 formed in a wall portion of the hollow casing 12 and, preferably at the tip 16, upon application of a force. The leash 30 has a first end thereof being secured to the drum 22 in a conventional manner. By way of an example only of FIG. 5, an aperture 29 may be provided in one side of the leash spool 20 and the first end of the leash 30 will be extended outwardly through the aperture 29 and terminated with a fitting or a knot 38.

A coiled spring means 40 is positioned within the hollow casing 12 and, more particularly, received within the cavity 26 of the first side 24. In a conventional manner, the coiled spring means 40 has one end thereof being secured to the spool 20 by way of a slot 42. A second end of the coiled spring means 40 fits into a slot 17 formed in the axle 14. In this arrangement, the coiled spring means 40 biases the spool 20 for rotation to retract the leash 30 into the hollow casing 12.

Additionally, there is means, generally designated as 50, which is disposed on and secured to a free end 34 of the leash 30 and to such collar 4 for securing the apparatus 10 thereto in a condition wherein the hollow casing 12 is positioned adjacent such collar 4 in a non-operable position and wherein the hollow casing 12 is manually moved in a direction away from such collar 4 to extend the leash 30 during use.

In a presently preferred embodiment of the invention, the securing means 50 includes a rigid member 52 having a collar abutting surface 54. Preferably, at least the collar abutting surface 54 has concave shape to compliment the countour of the collar 4. A pair of first mounting apertures 56 are formed in the rigid member 52. A pair of second mounting apertures 58 are formed in such collar 4 and are further formed in alignment with the pair of first mounting apertures 56. A pair of fasteners 60, preferably rivets, are employed, wherein each rivet 60 engages a respective one of the pair of first mounting apertures 56 and the pair of second mounting apertures 58 for securely attaching the rigid member 52 to the collar 4.

The free end 34 of the leash 30 may be rigidly secured to the rigid member 52. But preferably, there is a socket 62 which is formed in the collar abutting surface 54 of the rigid member 52 and a partially spherical member 64 which is operably positioned within the socket 62 prior to securely attaching the rigid member 50 to such collar 4. The partially spherical member 64 has a tubular portion 66 which is secured onto the free end 34 of the leash 30, preferably by crimping. Preferably, the outer diameter of the tubular portion 66 is sized to snugly fit into the aperture 18 when the leash 30 is fully retracted into the hollow casing 12. The upper end 65 of the partially spherical member 64 is either flat or slightly concave to compliment the shape of the rigid member 52 and enable the rigid member 52 to operably abut the outer surface of the collar 4. The combination of the socket 62 and the partially spherical member 64 enables the apparatus 10 to swing or rotate when not in use thus preventing wear of the leash 30. The presently preferred material of the socket 62 and the partially spherical member 64 is stainless steel.

Figure 2:
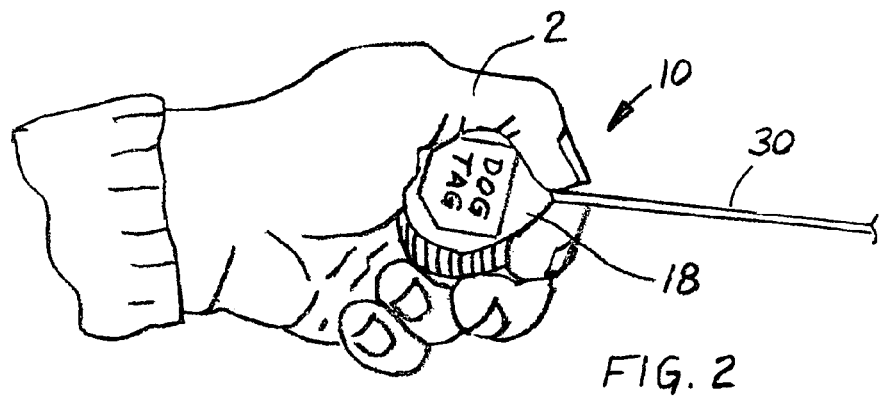
FIG. 2 is a perspective view of the apparatus of FIG. 1, particularly illustrating fit of a leash containing casing of such apparatus within pet's owner hand during use.
Figure 3:
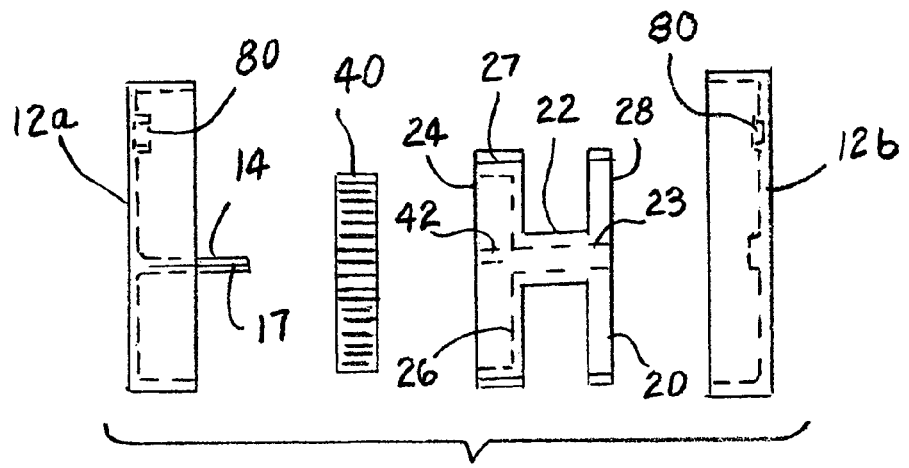
FIG. 3 is a partial exploded side elevation view of the apparatus of FIG. 1.

It will be understood that secure attachment of the leash apparatus 10 to the collar 4 eliminates condition wherein the leash apparatus 10 is lost or misplaced unless the collar 4 is removed from the pet which happens rarely. Furthermore, the leash apparatus 10 is positioned in close proximity to the collar 4 in a non-operable condition. To use the leash apparatus 10 the pet owner grabs the outer surface of the hollow casing 12 with the hand 2, as best shown in FIG. 2, simply pulls onto it thus applying a force in a direction away form the collar 4, causing the leash 30 to extend and causing the hollow casing 12 to move away from the collar 4. Thus, the hollow housing 12 is also employed as a handle for the leash apparatus 10. The pet is then free to roam, being limited only by the extended length of the leash 30. To position the apparatus 10 into a non-operative position, the pet owner releases the force applied onto the hollow casing 12.

It is within the scope of the present invention that the size of the hollow casing 12 and the length of the leash 30 will be determined depending on the size of the pet. For example, a leash formed from a 0.090 inch diameter nylon cord and being between about 3.0 feet and 3.5 feet in length is suitable for use with a small dog. Such leash 30 fits into a hollow housing 12 having a round cross-section which is disposed in a plane of rotation of the leash spool 30 and which is based shown in FIG. 6. The size of such hollow casing 12 is about 1.25 inches in diameter and about 0.63 inches in thickness. A larger hollow housing 12 and a longer leash 30 will be suitable for use with a large dog such as a Sheppard, Labrador and the like.

While the hollow housing 12 remains in closed proximity to the collar 4 due to the retracting force applied by the coiled spring means 40, it has been found advantageous to provide a brake means, generally designated as 70, which is engageable with the leash spool 30 for fixing the hollow casing 12 at a predetermined distance from such collar 4 when the leash 30 is extended from the hollow casing 12 and for preventing accidental movement of the hollow casing 12 away from the collar 4 when the apparatus 10 is not in use and when the hollow casing 12 is positioned adjacent the collar 4.

Figure 4:
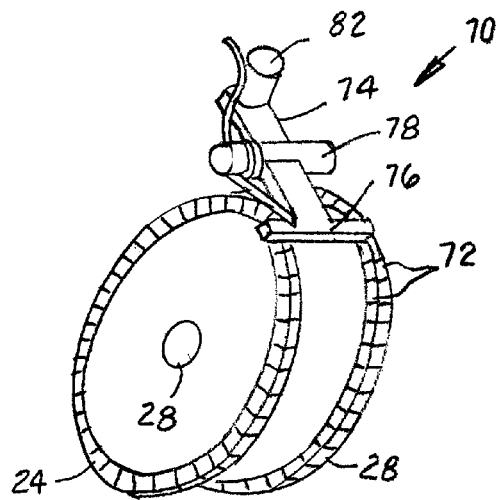
FIG. 4 is a partial perspective view of a brake mechanism which is employed within apparatus of FIG. 1 for fixing extended length of the leash and which is constructed according to a presently preferred embodiment of the invention.
Figure 5:
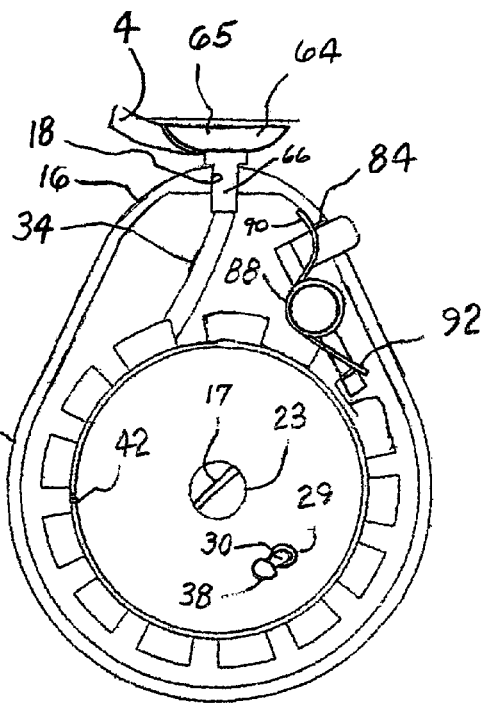
FIG. 5 is a side elevation view of the brake mechanism of FIG. 4.

Now in reference to FIGS. 4-5 and in accordance with the presently preferred embodiment of the invention, such brake means 70 includes a plurality of notches 72 formed in a peripheral edge of each of the first side 24 and the second side 28 of the spool 20 and which are aligned therebetween. A lever 74 has an elongated stop member 76 formed on one end thereof perpendicular to the longitudinal axis of the lever 74. The stop member 76 is sized to operatively engage a pair of opposed notches 72 in the sides 24 and 28 of the leash spool 30. A shaft portion 78 is formed intermediate the ends of the lever 74 and parallel to the stop member 76. The ends of the shaft portion 78 are received within a pair of sockets 80 formed on the inner surface portions defined by casing halves 12a and 12b. It is, however, within the scope of the present invention to form a tubular-shaped portion (not shown) on the lever 74 and provide at least one pivot pin (not shown) extending from the interior surface of either hollow casing half 12a or 12b.

A button shaped member 82 is secured to and is disposed on the other end of the lever 74. The button shaped member 82 extends outwardly from the upper surface of the lever 74 and has a distal end thereof protruding through the aperture 84 formed within the hollow casing 12. Preferably, the lever 74, the stop member 76, the shaft portion 78 and the button shaped member 82 are formed as a unitary member form a plastic material by a molding process. A bias spring 86 has a coiled portion 88 which is positioned on the shaft portion 78 prior to assembling casing halves together. The first end 90 of the spring 86 is formed in abutting relationship with the interior surface of the hollow casing 12 and the second end 92 of the spring 86 is formed to rest on the upper surface of the lever 74 or on the stop member 76.

In operation, the pet owner simply depresses the button shaped member 82 causing rotation of the lever 74 in a counter-clockwise position in FIGS. 4-5 and disengagement of the stop member 76 from the pair of notches 72 and, more particularly, enabling rotation of the leash spool 20. When the leash 30 has either retracted or extended as required, the pet owner simply releases the button shaped member 82 causing the spring 86 to reengage stop member 76 with the pair of notches 72 and fix the leash 30 in either extended or retracted position. It will be appreciated that when the pet owner depresses the button shaped member 82 and disengages stop member 76 from the notches 72, the leash spool 30 is free to rotate within the hollow casing 12 in a direction which is dependent upon the use of the apparatus 10. If the pet pulls onto the leash 30, then the leash 30 will extend from the hollow casing 12 or the pet owner may let the hollow casing 12 to move toward the collar 4 for positioning the hollow casing 12 into the non-operative position.

To accommodate the employment of the brake means 70, it has been found advantageous for the hollow casing 12 to have a pear shaped cross-section which is disposed in a plane of rotation of the leash spool 30, as best shown in FIG. 5 by extending the tip 16 away form the rotational axis of the leash spool 20. The pear shaped cross-section has an additional advantage of reducing the angle at which the leash 30 is routed through the leash aperture 18 which is positioned at the tip 16 of the hollow housing 12, thus facilitating ease of winding or unwinding of the leash 30.

Figure 6:
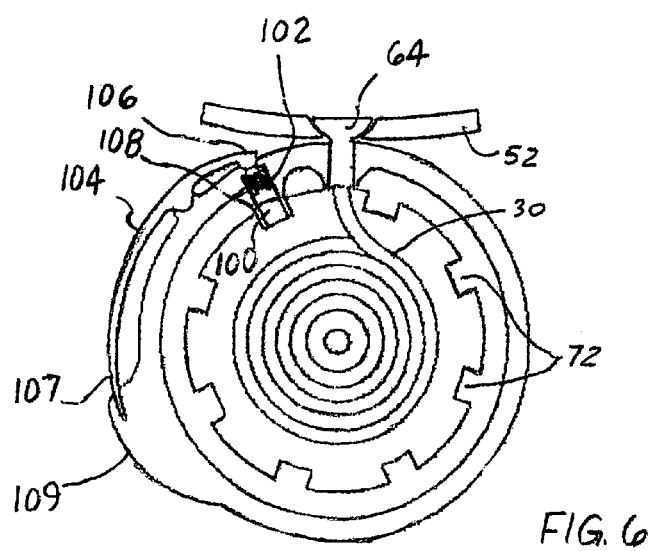
FIG. 6 is a is a side elevation view of the brake mechanism constructed according to an alternative embodiment of the invention.

It is also within the scope of the present invention to provide an alternative embodiment of the brake means 70, best shown in FIG. 6, which includes a stop member 100 being sized to operatively engage a pair of opposed notches 72 in the sides 24 and 28 of the leash spool 30. A shaft portion 102 has one end thereof being disposed on and secured to the stop member 100 intermediate its ends. A lever 104 is pivotally attached to the exterior surface of the hollow housing 12 and has a first end 106 thereof being pivotally connected to a distal end of the shaft portion 102. A coiled compression bias spring 108 is disposed on the shaft portion 102 and is caged between the interior surface of the hollow housing 12 and the stop member 100. The second end 107 of the lever 104 is manually movable toward the hollow casing 12 to disengage the stop member 102 from the notches 72. The bias spring 108 returns the stop member 100 back into engagement with the notches 74 when the lever 104 is released. The hollow housing 12 may be provided with a hollow abutment 109 to receive the second end 107.

Figure 7:
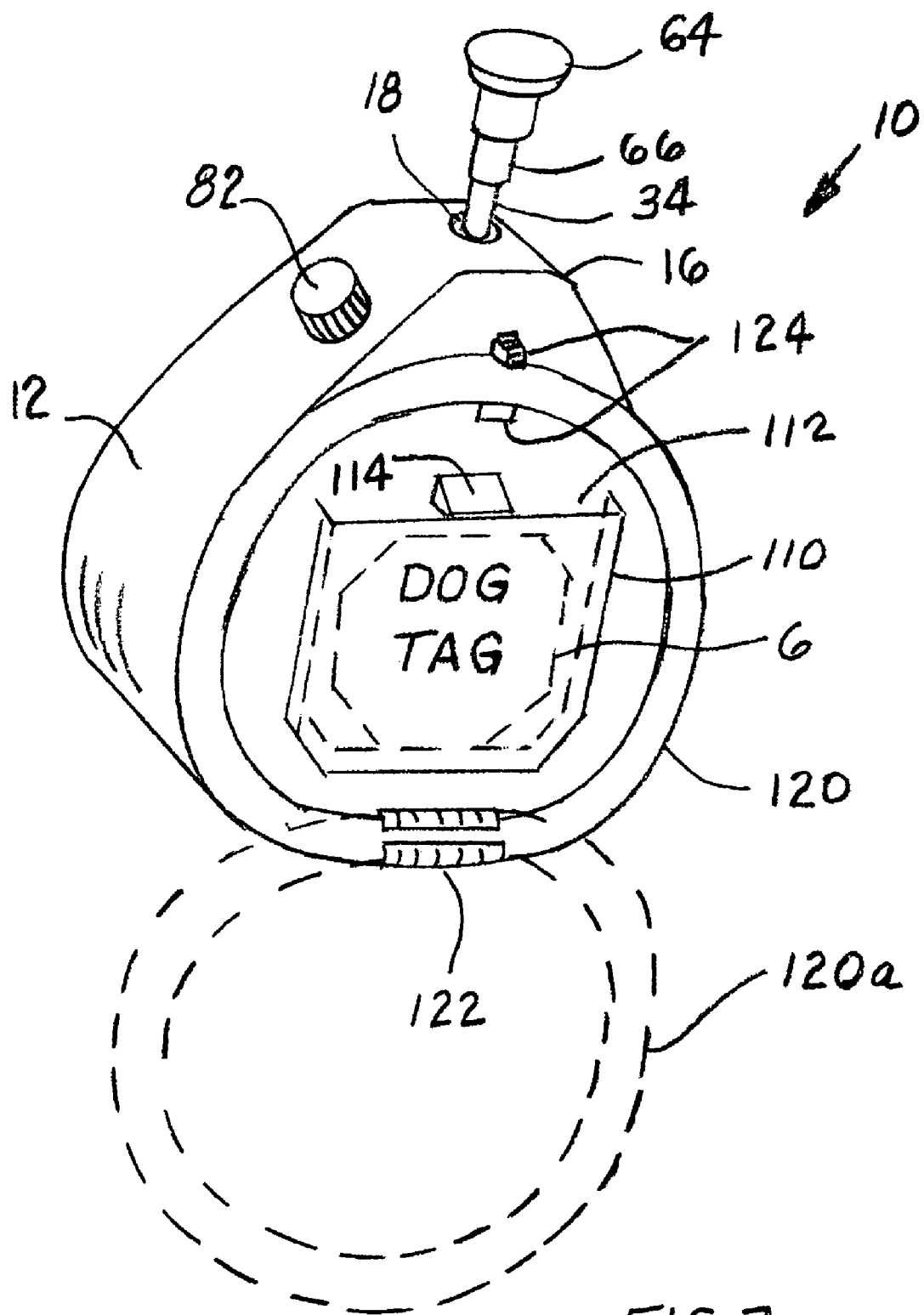
FIG. 7 is a perspective view of the apparatus of FIG. 1, particularly illustrating optional pocket for carrying pet's identification or immunization tags and optional carrying or hooking ring.

In further reference to FIG. 7, therein is illustrated means which is disposed on and secured to an exterior surface of the hollow casing 12 for receiving a document 6 identifying such pet. Such document may be one of a pet identification tag, pet immunization tag, and a combination thereof. Preferably, the document receiving means includes at least a translucent pocket 110 which is integrally formed with the exterior surface of the hollow casing 12. A protrusion 114 is also formed on the outer surface of the hollow housing 12 and adjacent the open end 112 of the pocket 110 for securing the document 6 received therewithin.

Additionally, the apparatus 10 may be adapted with a ring 120 which is pivotally attached to the exterior surface of the hollow housing 12 with a simple flexible pivot 122 being integrally formed on such exterior surface. The ring 120 is enabled to pivot between a stored position in abutting relationship with the exterior surface of the hollow housing 12 and an operative position which is shown by reference numeral 120a in FIG. 7. A flexible catch means 124 may be further formed the exterior surface of the hollow housing 12, preferably integral therewith, for securing the ring 120 in the stored position. Although the ring 120 is shown in FIG. 7 as being formed on the same exterior surface as the pocket 110, it may be alternatively formed on the opposed exterior surface of the housing 12. Employment of the ring 120 enables the pet owner to carry the apparatus 10 on its finger or attach apparatus 10 to a hook shaped member (not shown).

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. In combination with a pet collar, a leash apparatus comprising:
    (a) a hollow casing having each of a predetermined shape and a predetermined size;
    (b) a leash spool having a drum with a through bore for rotation on an axle which extends from an interior surface defined by said hollow casing and a pair of sides each disposed on and secure to a respective end of said drum;
    (c) a leash coiled on said drum in a retracted position and extendable through an aperture formed in a wall of said hollow casing upon application of a force;
    (d) a spring disposed within said hollow casing and engageable with each of said spool and said axle, said spring biasing said spool for rotation to retract said leash into said hollow casing;
    (e) means for securing said hollow casing to said leash, whereby said hollow casing is positioned adjacent said collar in a non-operable position, and whereby said hollow casing is manually moved in a direction away from said collar to extend said leash during use;
    (f) a plurality of spaced apart notches formed in each peripheral edge of said each side of said leash spool;
    (g) an elongated lever disposed between said pair of sides of said spool and having a longitudinal axis;
    (h) an elongated stop member secured to and disposed on one end of said lever perpendicular to said longitudinal axis, said elongated stop member having a length thereof so sized that ends of said elongated stop member operatively engage a pair of opposed notches in each side of said spool;
    (i) k a shaft portion formed intermediate ends of said lever and parallel to said stop member, said shaft portion having each end thereof extending past a respective side edge of said lever, said each end being received within a socket formed on an interior surface of said hollow casing;
    (j) a button shaped member secured to and is disposed on an opposed end of said lever, said button shaped member extends outwardly from an upper surface of said level, said button shaped member protruding through an aperture formed within a wall of said hollow casing and which is manually depressed to disengage said stop member from said pair of notches; and
    (k) a spring having each of a coiled portion being positioned on said shaft portion of said lever, a first end disposed in abutting relationship with said interior surface of said hollow casing, and a second end resting on an upper surface of one of said lever and said stop member, said spring returns said stop member into engagement with said pair of notches when said button shaped member is released.

2. The apparatus, according to claim 1, wherein a cross-section of said hollow casing which is disposed in a plane of rotation of said leash spool is one of a round and a pear shaped.

3. The apparatus, according to claim 1, wherein said securing means includes:
    (a) a rigid member having a collar abutting surface;
    (b) a pair of first mounting apertures formed in said rigid member;
    (c) a pair of second mounting apertures formed in said collar and in alignment with said pair of first mounting apertures;
    (d) a pair of fasteners each engaging a respective one of said pair of first mounting apertures and said pair of second mounting apertures for securely attaching said rigid member to said collar;
    (e) a socket formed in said collar abutting surface; and
    (f) a spherical member which is positioned within said socket prior to securely attaching said rigid member to said collar and which has a portion thereof being rigidly secured to a free end of said leash.

4. The apparatus, according to claim 1, wherein said apparatus includes means disposed on and secured to an exterior surface of said casing for receiving a document identifying such pet.

5. The apparatus, according to claim 4, wherein said document is one of an identification tag, immunization tag, and combination thereof.

6. The apparatus, according to claim 4, wherein said document receiving means includes a pocket which is integrally formed with said exterior surface of said casing.

7. The apparatus, according to claim 6, wherein said document means further includes means positioned adjacent an open end of said pocket for securing said document received therewithin.

8. The apparatus, according to claim 1, wherein said apparatus includes:
    (a) a pivot disposed on and secured to an exterior surface of said hollow casing; and
    (b) a ring pivotally attached to said pivot for movement between a stored position wherein said ring is disposed in abutting relationship with said exterior surface of said hollow housing and an operative position wherein said ring is positioned external to said hollow casing.

9. The apparatus, according to claim 8, wherein said apparatus further includes a flexible catch means for securing said ring in said stored position.

10. In a retractable pet leash apparatus having a hollow casing, a spool which is mounted for rotation within said casing and which has a pair of sides, a leash which is coiled on said spool in a retracted position and which is extendable through an aperture formed in a wall of said hollow casing upon application of a force, a spring means which is disposed within said hollow housing and which is engageable with said spool for biasing said spool for rotation to retract said leash into said hollow casing, an improvement comprising a brake means which is engageable with said spool for selectively fixing a free end of said leash at a predetermined distance from said casing and enabling retraction and extension of said leash relative to said hollow casing, said brake means including:

(a) a plurality of spaced apart notches formed in each peripheral edge of said each side of said leash spool;
(b) an elongated lever disposed between said pair of sides of said spool and having a longitudinal axis;
(c) an elongated stop member secured to and disposed on one end of said lever perpendicular to said longitudinal axis, said elongated stop member having a length thereof so sized that ends of said elongated stop member operatively engage a pair of opposed notches in each side of said spool;
(d) a shaft portion formed intermediate ends of said lever and parallel to said stop member, said shaft portion having each end thereof extending past a respective side edge of said lever, said each end being received within a socket formed on an interior surface of said hollow casing;
(e) a button shaped member secured to and is disposed on an opposed end of said lever, said button shaped member extends outwardly from an upper surface of said level, said button shaped member protruding through an aperture formed within a wall of said hollow casing and which is manually depressed to disengage said stop member from said pair of notches; and
(f) a spring having each of a coiled portion being positioned on said shaft portion of said lever, a first end disposed in abutting relationship with said interior surface of said hollow casing, and a second end resting on an upper surface of one of said lever and said stop member, said spring returns said stop member into engagement with said pair of notches when said button shaped member is released.

11. The improvement of claim 10, further comprising means disposed on and secured to an exterior surface of said hollow casing for receiving a document identifying a pet wearing said collar.

12. The improvement, according to claim 11, wherein said document receiving means includes a pocket which is integral with said exterior surface and which has an open edge for receiving said document.

13. The improvement, according to claim 11, wherein said document receiving means further includes a protrusion which is formed on said outer surface of said hollow housing and adjacent said open edge of said pocket for securing said document received therewithin.

* * * * *